United States Patent
Wu

(10) Patent No.: US 10,185,604 B2
(45) Date of Patent: Jan. 22, 2019

(54) METHODS AND APPARATUS FOR SOFTWARE CHAINING OF CO-PROCESSOR COMMANDS BEFORE SUBMISSION TO A COMMAND QUEUE

(71) Applicant: Advanced Micro Devices, Inc., Sunnyvale, CA (US)

(72) Inventor: Winthrop Wu, Shrewsbury, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 14/529,299

(22) Filed: Oct. 31, 2014

(65) Prior Publication Data

US 2015/0121393 A1    Apr. 30, 2015

Related U.S. Application Data

(60) Provisional application No. 61/897,846, filed on Oct. 31, 2013.

(51) Int. Cl.
G06F 9/50    (2006.01)
G06F 9/54    (2006.01)

(52) U.S. Cl.
CPC ............ *G06F 9/544* (2013.01); *G06F 9/5016* (2013.01)

(58) Field of Classification Search
CPC .................................. G06F 9/544; G06F 9/5016
See application file for complete search history.

(56) References Cited

U.S. PATENT DOCUMENTS

| | | | | |
|---|---|---|---|---|
| 5,355,443 A * | 10/1994 | Kim | .................... | G09G 5/06 |
| | | | | 345/589 |
| 8,683,184 B1* | 3/2014 | Lew | .................... | G06F 3/14 |
| | | | | 345/504 |
| 2003/0001848 A1* | 1/2003 | Doyle | .................. | G06F 9/463 |
| | | | | 345/501 |
| 2010/0281483 A1* | 11/2010 | Rakib | ................. | G06F 9/3009 |
| | | | | 718/102 |
| 2012/0131309 A1* | 5/2012 | Johnson | ............... | G06F 9/30 |
| | | | | 712/41 |
| 2014/0344826 A1* | 11/2014 | Wu | ..................... | G06F 9/4881 |
| | | | | 718/104 |

OTHER PUBLICATIONS

Eggers et al. Simultaneous Multithreading: A Platform for Next-Generation Processors. [online] (1997). IEEE., pp. 12-19. Retrieved From the Internet <http://web.cs.msu.edu/~cse820/readings/ieee_micro.pdf>.*

Yoo et al. VSSIM: Virtual machine based SSD simulator. [online] (May 10, 2013). IEEE., pp. 1-14. Retrieved From the Internet <http://www.esos.hanyang.ac.kr/files/publication/conferences/international/VSSIM_Yoo_MSST_2013.pdf>.*

* cited by examiner

*Primary Examiner* — Emerson C Puente
*Assistant Examiner* — Jonathan R Labud
(74) *Attorney, Agent, or Firm* — Faegre Baker Daniels LLP

(57) ABSTRACT

Methods and apparatus of interleaving two or more workloads are presented herein. The methods and apparatus may comprise a schedule controller and a coprocessor. The schedule controller is operative to utilize the first storage unit to manage context stored therein that allows for the coprocessor to interleave the two or more workloads that can be directly supported by the first storage unit. The coprocessor includes a dedicated first storage unit and an engine.

19 Claims, 6 Drawing Sheets

METHODS AND APPARATUS FOR SOFTWARE CHAINING OF CO-PROCESSOR COMMANDS BEFORE SUBMISSION TO A COMMAND QUEUE

RELATED APPLICATIONS

This application claims priority to Provisional Application Ser. No. 61/897,846, filed on Oct. 31, 2013, having inventor Winthrop Wu, titled "METHODS AND APPARATUS FOR SOFTWARE CHAINING OF CO-PROCESSOR COMMANDS BEFORE SUBMISSION TO A COMMAND QUEUE", and is incorporated herein by reference.

FIELD OF THE DISCLOSURE

The disclosure relates generally to a coprocessor and more particularly to coprocessors capable of interleaving a plurality of workloads.

BACKGROUND

A computer system typically comprises, inter alia, a central processing unit (CPU), memory, and input/output peripherals. The CPU performs arithmetic and logical instructions on integer and Boolean data types. The CPU typically is a multi-threaded processor that is capable of executing instructions simultaneously and non-sequentially. While these operations continue to be necessary, more specialized processing is also useful for certain devices. Performing specialized processing on general-purpose microprocessors designed to process integer and Boolean data types, such as the CPU, requires complex software routines, and processing is relatively slow. To meet that demand, computer processor designers developed coprocessors, such as graphics processing units (GPUs), which are data processors designed specifically to execute a particular task or workload in order to offload some of the processing duties from another processor, usually the CPU in the system, in order to accelerate computer system performance. In some cases, a coprocessor may reside on the system's motherboard with the CPU, and in other systems a coprocessor may reside on a suitable expansion card.

Coprocessors require another processor, such as the CPU, a microcontroller, or any suitable processor, to manage memory and execute program flow control operations. Coprocessors and the CPU typically communicate using a shared memory, which often leads to significant amount of overhead and latency in transferring data between the two processors. This transferring of data includes the CPU providing initial instructions to the coprocessor, and the coprocessor providing data back to the CPU. Unlike the CPU, since coprocessors may be single-threaded and process information sequentially, coprocessors may experience performance issues when multiple calculation-intensive workloads or applications need to be run simultaneously. For example, a coprocessor needs to finish running a first workload or application prior to starting and finishing a second workload or application. One disadvantage of this way of processing is that when the first workload or application requires the majority of the coprocessor's processing resources, the second or subsequent workloads cannot be processed simultaneously by the coprocessor. By running the first workload or application until completion, the coprocessor is delaying processing on other workloads. This disadvantage is exacerbated in light of the fact that a coprocessor either requires the workload or application to be loaded in its entirety into the shared memory prior to the start of processing, causing further delays, or requires the workload or application to be streamed in its entirety to the engine of the coprocessor prior to processing other queued workloads. For instance, for a coprocessor designed to compress a 10 megabyte image workload, the coprocessor would either need to wait for the entire 10 megabyte image to be stored into the shared memory before beginning to compress the image, or needs to stream the entire 10 megabyte image to the engine prior to compressing other queued images. The coprocessor cannot start compressing the first megabyte of the image, for example, until the entire 10 megabyte image is available in shared memory.

Although processors such as the CPU can handle multi-tasking, the general-purpose nature of the CPU is not adequate for calculation-intensive workloads that may be processed more efficiently by specialized engines within a coprocessor. Without coprocessors, the CPU would have to emulate the engine function of a coprocessor, which drives up resource management costs. What is needed is a software-based scheduling mechanism to operate on multiple workloads simultaneously in the context of coprocessors for efficient processing and minimum overhead.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Figure 1:
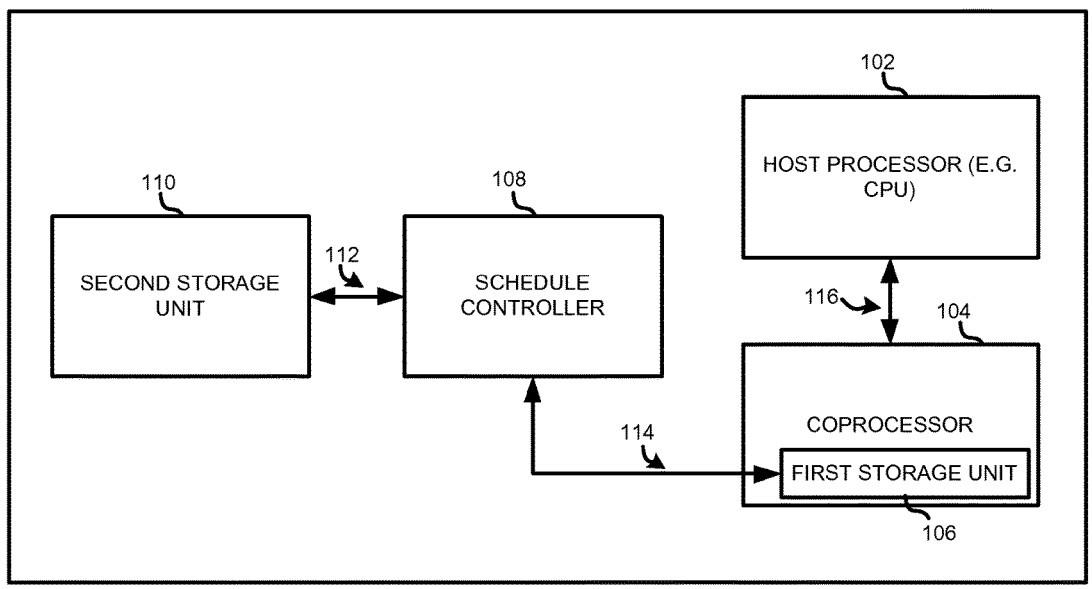
FIG. 1 is a block diagram illustrating one example of an apparatus employing a schedule controller interposed between a coprocessor and a secondary storage unit.

Briefly, methods and apparatus of interleaving two or more workloads are disclosed. The methods and apparatus include utilizing, by a schedule controller, a first storage unit within a coprocessor to manage context stored therein that allows for the coprocessor with an engine to interleave the two or more workloads that can be directly supported by the first storage unit. The first storage unit may store the context of each of the two or more workloads depending on the size of the first storage unit. The methods and apparatus further include utilizing, by the schedule controller, a second storage unit to manage context stored in the first storage unit that allows for the coprocessor to interleave at least one additional workload than can be directly supported by the first storage unit. When the first storage unit can no longer hold context for an additional workload, the schedule controller may save context stored in the first storage unit into the second storage unit in order to free up space in the first storage unit. This allows for immediate processing of the additional workload. The engine may be specific to encryption, such as based on the Advanced Encryption Standard (AES), hashing, such as the Secure Hash Algorithm (SHA), error correction, such as Error-correcting code (ECC), or any suitable engine. The first and second storage units may be non-volatile or volatile memory, such as hard disk drives (HDD), solid state drives (SSD), flash memory, random-access memory (RAM), read-only memory (ROM), or any other suitable memory devices. The first and second storage units may be fixed or removable storage mediums.

The schedule controller may be operative to assign the two or more workloads and the at least one additional workload into at least one command queue. The schedule controller may further be operative to segment the two or more workloads and the at least one additional workload into a plurality of workload commands to facilitate the interleaving of the two or more workloads and the at least one additional workload in the at least one command queue. One of ordinary skill in the art will recognize that the schedule controller may define the granularity of the plurality of workload commands. Each command queue preferably has a designated slot in the first storage unit in which to store context. In other words, there is preferably a one-to-one correspondence between the number of designated slots in the first storage unit and the number of command queues. If there are n workloads needing to be interleaved in one command queue with a designated slot m, there may be n contexts required to facilitate the interleaving process, all of which may be assigned to slot m, provide enough storage space in slot m. This will be further explored in relation to FIG. 5.

The methods and apparatus provide an additional level of interleaving by further including a command interleaver operative to interleave the plurality of already interleaved workload commands in the command queues prior to processing by the engine of the coprocessor. This occurs across either a portion or all command queues. The command interleaver is further operative to direct the engine in saving a context associated with each of the two or more workloads and the at least one additional workload into the first storage unit. Depending on the size of the first storage unit, the first storage unit may inevitably run out of space to hold context associated with a plurality of workloads, thus placing a ceiling on the number of workloads that can be simultaneously processed. In order to overcome this limitation, the schedule controller utilizes the second storage unit to manage context stored in the first storage unit by saving off the context from the first storage unit to the second storage unit when the context is not necessary for processing of the corresponding workload. The schedule controller can restore the context from the second storage unit to the first storage unit when the context is necessary for processing of the corresponding workload.

Among other advantages, by including a first storage unit in the coprocessor to store various contexts for workloads, retrieving context quickly to facilitate interleaving of workloads reduces overhead in the execution of the workloads compared to a prior art coprocessor that does not include a first storage unit. Further, by including a second storage, preferably external to the coprocessor, the size limitation of the first storage unit in holding context can be alleviated to allow for even additional workloads to be processed that otherwise would not be possible in the prior art. In addition, by segmenting the workloads into a plurality of workload commands to facilitate the interleaving of the two or more workloads and the at least one additional workload in the at least one command queue, the coprocessor may begin processing on portions of a workload that is available in the shared memory rather than waiting on the entire workload to be made available. Other advantages will be recognized by those of ordinary skill in the art.

FIG. 1 is a block diagram illustrating one example of an apparatus 100 employing a schedule controller 108 interposed between a coprocessor 104 and a secondary storage unit 110. In this example, the apparatus 100 may comprise any suitable device, for example, a laptop computer, a desktop computer, a handheld device, HD television, a server, or any such device that makes use of a coprocessor. It is understood that any other suitable component may also be included in the apparatus 100. For purposes of illustration only, the apparatus 100 will be described as a computer having a host processor 102 such as a CPU. The host processor 102 and the schedule controller 108 each may include one or more processors that may be a host central processing unit (CPU) having one or multiple cores, a discrete graphic processing unit (GPU), an integrated GPU, a general processor (e.g., APU, accelerated processing unit, GPGPU, general-purpose computing on GPU), or any suitable combination thereof or any other suitable processor. The coprocessor 104 may be any fixed-function processor such as a microprocessor or any other suitable processor used to supplement the functions of the host processor via communication link 116. Some examples of functions include signal processing, image rendering, encrypting, and the like. Here, the schedule controller 108 manages saving off context from the first storage unit 106, via communication link 114, to the second storage unit 110, via communication link 112. The schedule controller 108 also manages restoring context from the second storage unit 110, via communication link 112, to the first storage unit 106, via communication link 114. The communication links 112, 114, and 116 are buses or any other suitable links.

Figure 2:
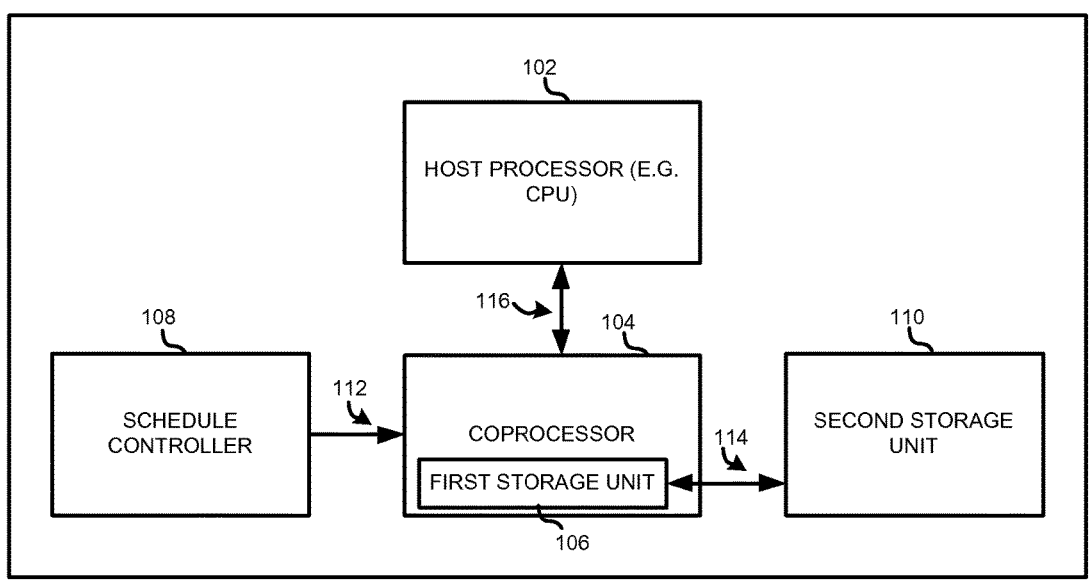
FIG. 2 is a block diagram illustrating another example of an apparatus employing a coprocessor interposed between a schedule controller and a secondary storage unit.

FIG. 2 is a block diagram illustrating another example of an apparatus 200 employing the coprocessor 104 interposed between the schedule controller 108 and the secondary storage unit 110. In this example, the apparatus 200 may comprise any suitable device, for example, a laptop computer, a desktop computer, a handheld device, HD television, a server, or any such device that makes use of a coprocessor. It is understood that any other suitable component may also be included in the apparatus 200. For purposes of illustration only, the apparatus 200 will be described as a computer having a host processor 102 such as a CPU. The host processor 102 and the schedule controller 108 each may include one or more processors that may be a host central processing unit (CPU) having one or multiple cores, a discrete graphic processing unit (GPU), an integrated GPU, a general processor (e.g., APU, accelerated processing unit, GPGPU, general-purpose computing on GPU), or any suitable combination thereof or any other suitable processor. The coprocessor 104 may be any fixed-function processor such as a microprocessor, application-specific integrated circuit (ASIC), or any other suitable processor used to supplement the functions of the host processor via communication link 116. Some examples of functions include signal processing, image rendering, encrypting, and the like. Here, the schedule controller 108 directs the coprocessor 104, via the communication link 112, to manage saving and restoring context between the first storage unit 106 and the second storage unit 110, via the communication link 114. The communication links 112, 114, and 116 are buses or any other suitable links.

Figure 3:
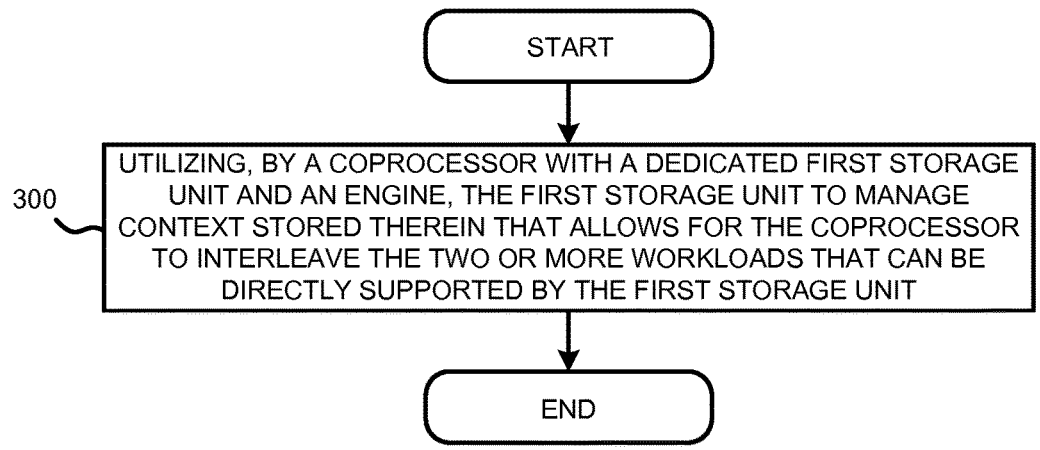
FIG. 3 is a flowchart generally illustrating an example of a method of interleaving two or more workloads.

FIG. 3 is a flowchart generally illustrating an example of a method of interleaving two or more workloads. Particularly, FIG. 3 may be performed by any suitable executing software module, hardware, executing firmware or any suitable combination thereof, such as programmed processors, discrete logic, for example, state machines, to name a few. As shown in block 300, the method includes utilizing, by a coprocessor with a dedicated first storage unit and an engine, the first storage unit to manage context stored therein that allows for the coprocessor to interleave the two or more workloads that can be directly supported by the first storage unit. The first storage unit may store the context of each of the two or more workloads depending on the size of the first storage unit. For instance, if a coprocessor with a dedicated first storage unit is designed to handle simultaneous execution to compress and interleave two images that are 10 megabytes each, by storing the context pertinent to both images in the first storage unit, the coprocessor avoids having to wait for each 10 megabyte image to be stored into the shared memory before beginning to compress each image. The coprocessor also avoids having to stream each intact 10 megabyte image to the engine prior to compressing the images. The coprocessor can start compressing and interleaving the first megabyte of the first image to the first megabyte of the second image, and rely on the context of each image for the engine to reassemble each image to be intact.

Figure 4:
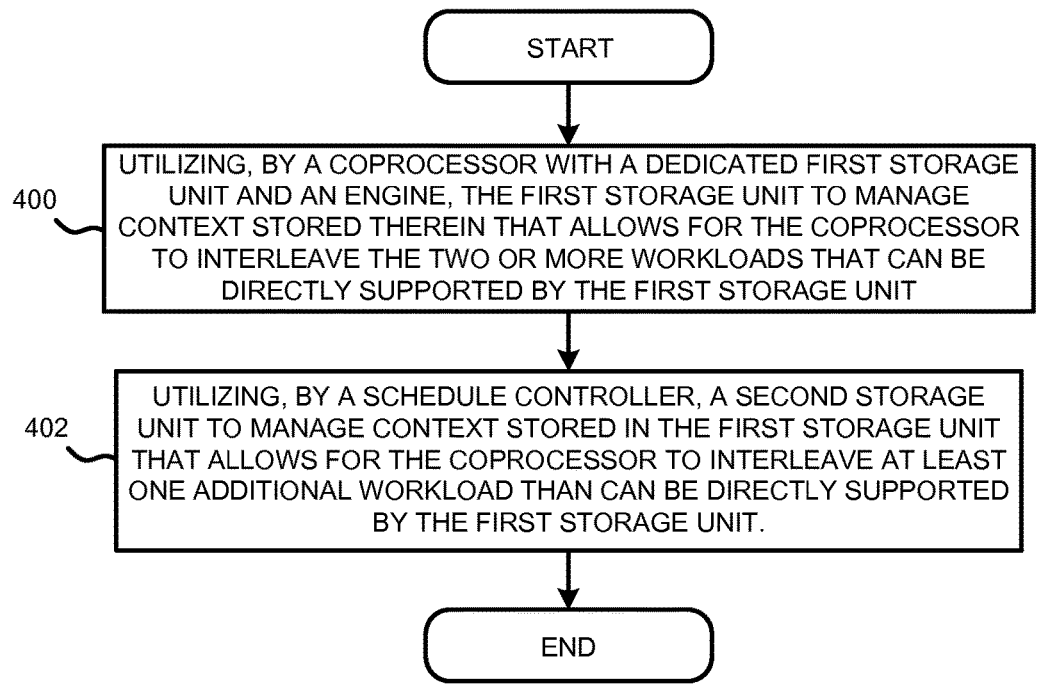
FIG. 4 is a flowchart generally illustrating another example of a method of interleaving two or more workloads.

FIG. 4 is a flowchart generally illustrating another example of a method of interleaving two or more workloads. FIG. 4 is a similar flowchart as to that of FIG. 3, with the addition of a second storage unit to store context for a workload that cannot be directly supported by the first storage unit. Particularly, FIG. 4 may be performed by any suitable executing software module, hardware, executing firmware or any suitable combination thereof, such as programmed processors, discrete logic, for example, state machines, to name a few. As shown in block 400, the method includes utilizing, by a coprocessor with a dedicated first storage unit and an engine, the first storage unit to manage context stored therein that allows for the coprocessor to interleave the two or more workloads that can be directly supported by the first storage unit. The method further includes utilizing, by a schedule controller, a second storage unit to manage context stored in the first storage unit that allows for the coprocessor to interleave at least one additional workload than can be directly supported by the first storage unit. When the first storage unit can no longer hold context for an additional workload, the schedule controller may save context stored in the first storage unit into the second storage unit in order to free up space in the first storage unit. This allows for immediate processing of the additional workload. For instance, if a coprocessor with a dedicated first storage unit is designed to handle simultaneous execution to compress up to two images that are 10 megabytes each, a third 10 megabyte image can be simultaneously compressed and interleaved along with the two images by utilizing a second storage unit to store context pertinent to either of the first and second images, thereby providing space for context pertinent to the third image in the first storage unit. By storing the context pertinent to either of the first and second images into the second storage unit, the coprocessor avoids having to wait for the first and second images to completely process before beginning to compress the third image. The coprocessor can start compressing and interleaving the first megabyte of the first image to the first megabyte of the second image, store the context of the first image into the second storage unit, compress and interleave the first megabyte of the third image by saving the context pertinent to the third image into the first storage unit, and resume compressing and interleaving the first image by saving the context pertinent to the third image into the second storage unit and restoring the context pertinent to the first image into the first storage unit.

Figure 5:
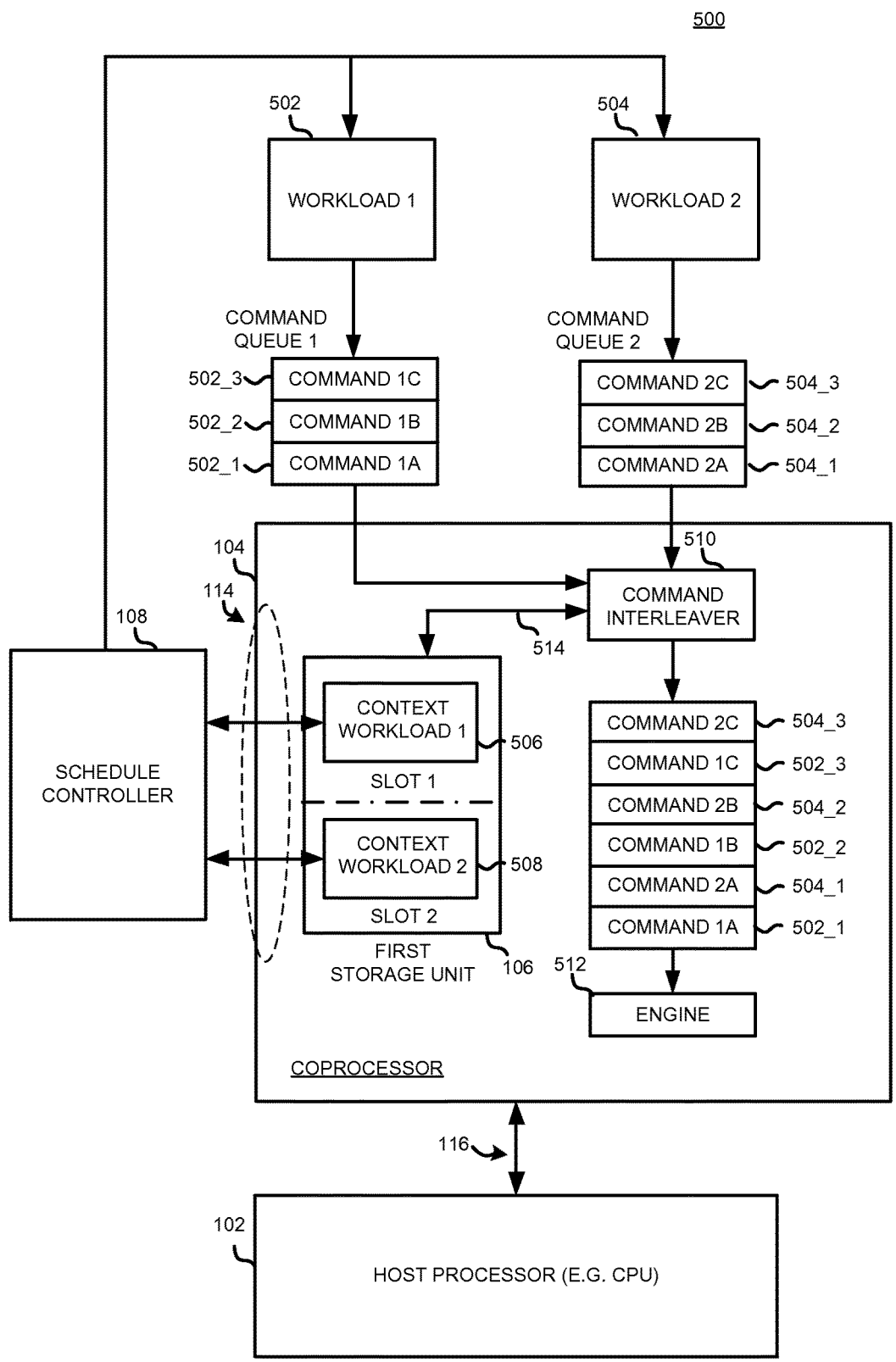
FIG. 5 is a block diagram illustrating one example of an apparatus of interleaving two workloads that is directly supported by the first storage unit.

FIG. 5 is a block diagram illustrating one example of an apparatus 500 interleaving two workloads that are directly supported by the first storage unit. In this example, the apparatus 500 includes the host processor 102, the coprocessor 104 with the internal first storage unit 106, and the schedule controller 108. The manufacturer of the coprocessor 104 with the internal first storage unit 106 may divide the first storage unit 106 into a plurality of slots that preferably correspond to a plurality of command queues to load workloads. Here, for illustration purposes, the first storage unit 106 is divided into two slots, SLOT 1 and SLOT 2, which allows for two corresponding command queues, COMMAND QUEUE 1 and COMMAND QUEUE 2. If two workloads, workload 502 and workload 504, need to be processed, each workload is segmented into commands by the schedule controller 108 and stored in a command queue. As illustrated, workload 502 is segmented into commands 502_1, 502_2, and 502_3, and stored in COMMAND QUEUE 1. Similarly, workload 504 is segmented into commands 504_1, 504_2, and 504_3, and stored in COMMAND QUEUE 2. One of ordinary skill in the art will appreciate that both the number of commands and the size of each command are variables that are determined by the schedule controller 108. The schedule controller 108 also stores context for each workload into the appropriate slot in the first storage unit 106. As illustrated, context 506 for workload 502 is stored in SLOT 1, and context 508 for workload 504 is stored in SLOT 2. Alternatively, the schedule controller 108 may store context for each command queue as opposed to each workload.

The command interleaver 510 of coprocessor 104 interleaves the commands of each workload. By utilizing the context stored in the first storage unit 106 via a communication link 514, the command interleaver 510 is able to submit interleaved workloads to engine 512 while still allowing the engine 512 to reassemble each workload. Although the command interleaver 510 produces interleaved workloads comprising commands 502_1, 504_1, 502_2, 504_2, 502_3, and 504_3, one of ordinary skill in the art will appreciate any suitable combination of commands. The communication link 514 is a bus or any other suitable link. For instance, workload 502 and workload 504 may be a 10 megabyte first image and a 10 megabyte second image, respectively. The first image may be segmented by the schedule controller 108 into 10 commands of 1 megabyte each and stored in COMMAND QUEUE 1. The second image may be segmented by the schedule controller 108 into 10 commands of 1 megabyte each and stored in COMMAND QUEUE 2. Context for the first and images may be stored in SLOT 1 and SLOT 2 of the first storage unit 106, respectively. The command interleaver 510 may then interleave the commands of each image for the engine 512 to execute compression instructions to compress both images.

Figure 6:
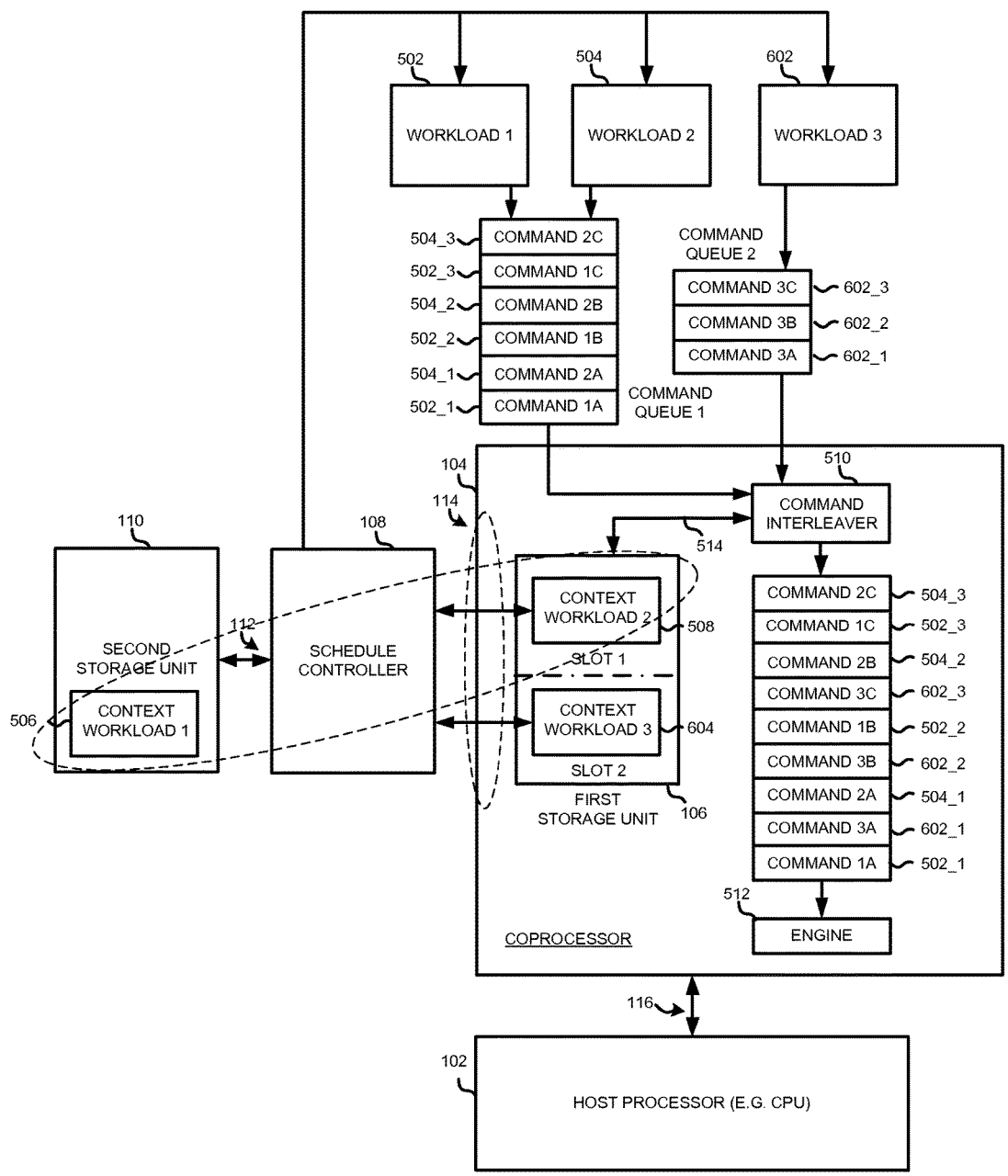
FIG. 6 is a block diagram illustrating one example of an apparatus of interleaving two workloads and an additional workload than can be directly supported by the first storage unit.

FIG. 6 is a block diagram illustrating one example of an apparatus 600 interleaving two workloads and an additional workload than can be directly supported by the first storage unit. FIG. 6 is a similar block diagram as to that of FIG. 5, with the addition of a second storage unit to store context for a workload that cannot be directly supported by the first storage unit. In this example, the apparatus 600 includes the host processor 102, the coprocessor 104 with the internal first storage unit 106, and the schedule controller 108. The manufacturer of the coprocessor 104 with the internal first storage unit 106 may divide the first storage unit 106 into a plurality of slots that preferably correspond to a plurality of command queues to load workloads. Here, for illustration purposes, the first storage unit 106 is divided into two slots, SLOT 1 and SLOT 2, which allows for two corresponding command queues, COMMAND QUEUE 1 and COMMAND QUEUE 2. Unlike the example illustrated in FIG. 5, there are more workloads that need to be processed than available command queues. If three workloads, workload 502, workload 504, and workload 602, need to be processed, each workload is segmented into commands by the schedule controller 108 and stored in a command queue. As illustrated, workload 502 is segmented into commands 502_1, 502_2, and 502_3, and stored in COMMAND QUEUE 1. Similarly, workload 504 is segmented into commands 504_1, 504_2, and 504_3, and stored in COMMAND QUEUE 1. The schedule controller 108 can interleave commands within COMMAND QUEUE 1. One of ordinary skill in the art will appreciate that the number of commands, the size of each command, and the order in which the commands are submitted to COMMAND QUEUE 1 are variables that are determined by the schedule controller 108. Workload 602 is segmented into commands 602_1, 602_2, and 603_3, and stored in COMMAND QUEUE 2. The schedule controller 108 also stores context for each workload into the appropriate slot in the first storage unit 106. If SLOT 1 has enough memory space to hold context 506 for workload 502 and context 508 for workload 504, the second storage unit 110 may not be used. However, as illustrated, if SLOT 1 does not have enough memory space to hold context 506 for workload 502 and context 508 for workload 504, the schedule controller 108 may store one of the contexts, such as context 506 of workload 502, into the second storage unit 110. Context 604 for workload 602 is stored in SLOT 2. Alternatively, the schedule controller 108 may store context for each command queue as opposed to for each workload. For example, since workloads 502 and 504 each comprise multiple commands, context for COMMAND QUEUE 1 may propagate from command 502_1 to command 504_1 and onwards until command 504_3.

The command interleaver 510 of coprocessor 104 interleaves the commands of each workload. By utilizing the context stored in the first storage unit 106 and the second storage unit 110, the command interleaver 510 is able to submit interleaved workloads to engine 512 while still allowing the engine 512 to reassemble each workload. Although the command interleaver 510 produces interleaved workloads comprising commands 502_1, 602_1, 504_1, 602_2, 502_2, 602_3, 504_2, 502_3, and 504_3, one of ordinary skill in the art will appreciate any suitable combination of commands. For instance, workload 502, workload 504, and workload 602 may be a 10 megabyte first image, a 10 megabyte second image, and a 10 megabyte third image, respectively. The first image may be segmented by the schedule controller 108 into 10 commands of 1 megabyte each and stored in COMMAND QUEUE 1. The second image may be segmented by the schedule controller 108 into 10 commands of 1 megabyte each and stored in COMMAND QUEUE 1. To facilitate simultaneous processing of both the first and second images within a command queue, the schedule controller 108 can interleave commands within COMMAND QUEUE 1. The third image may be segmented by the schedule controller 108 into 10 commands of 1 megabyte each and stored in COMMAND QUEUE 2. If SLOT 1 does not have enough memory space to hold contexts for both the first and second images, the schedule controller 108 may store context pertinent to the first image into the second storage unit 110. When the command interleaver 510 and engine 512 need context pertinent to the first image to compress the first image, the context for the second image may be stored to the second storage unit 110 and the first image may be restored from the second storage unit 110. Context for the third image may be stored in SLOT 2 of the first storage unit 106. The command interleaver 510 may then interleave the commands of each image for the engine 512 to execute compression instructions to compress all images.

Figure 7:
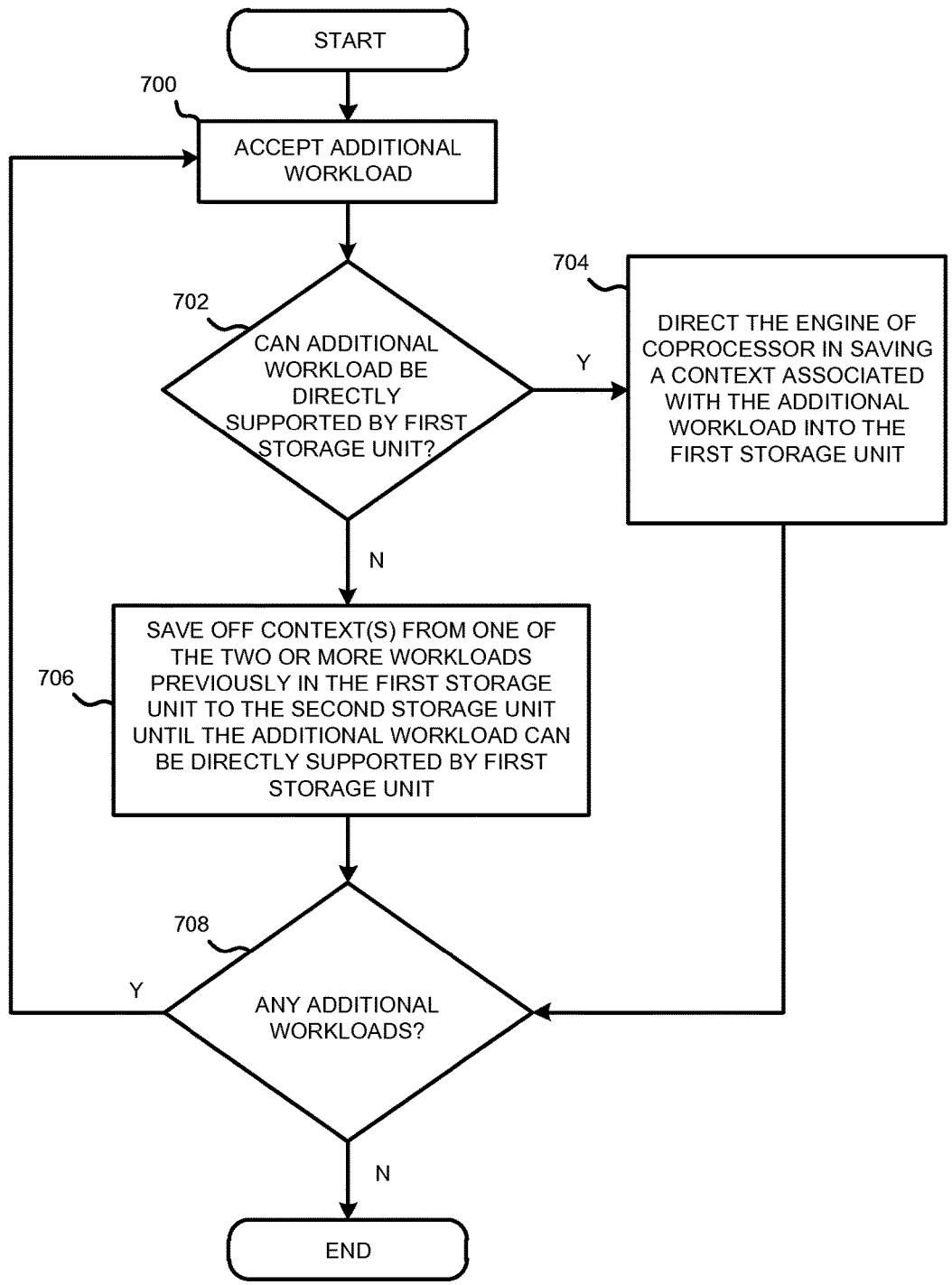
FIG. 7 is a flowchart illustrating, in more detail, an example of a method of interleaving two or more workloads.

FIG. 7 is a flowchart illustrating, in more detail, an example of a method of interleaving two or more workloads. Particularly, FIG. 7 describes the utilization of the first storage unit and the second storage unit. The method may be performed by the schedule controller 108 or any suitable executing software module, hardware, executing firmware or any suitable combination thereof, such as programmed processors, discrete logic, for example, state machine, to name a few. As shown in block 700, the method includes the schedule controller 108 accepting an additional workload for assignment into a command queue, such as accepting workload 504 for assignment into COMMAND QUEUE 1 of FIG. 6. As shown in block 702, the schedule controller 108 determines whether the additional workload can be directly supported by the first storage unit based on the space available in the slot of the first storage unit corresponding to the command queue, such as SLOT 1 for COMMAND QUEUE 1 in FIG. 6. As shown in block 704, if the schedule controller 108 determines the additional workload can be directly supported by the first storage unit, the schedule controller 108 directs the engine of the coprocessor in saving a context associated with the additional workload into the first storage unit. As shown in block 706, if the schedule controller 108 determines the additional workload cannot be directly supported by the first storage unit, the schedule controller 108 saves off context from one of the workloads previously stored in the first storage unit, such as context 506 of workload 502 in FIG. 6, to the second storage unit until the additional workload can be directly supported by the first storage unit in SLOT 1. As shown in block 708, the schedule controller 108 determines if additional workloads need processing. If the schedule controller 108 determines that additional workloads need processing, the method returns to block 700. If the schedule controller 108 determines that no additional workloads need processing, the method ends.

Figure 8:
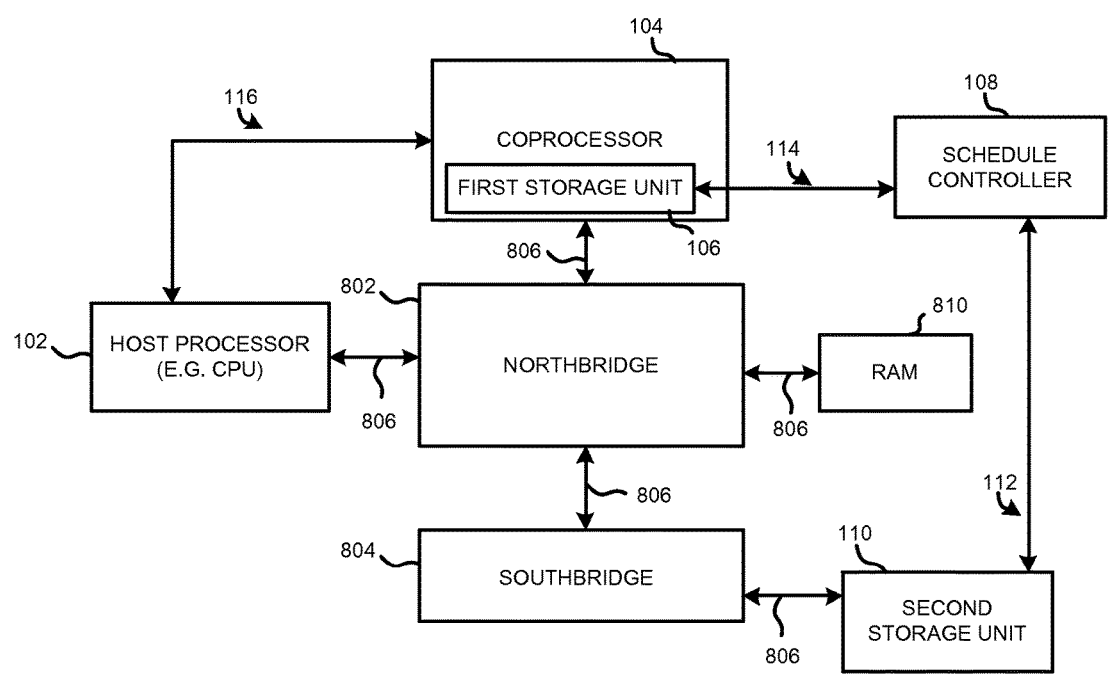
FIG. 8 is a block diagram of a chipset illustrating the location of the coprocessor and schedule controller.

FIG. 8 is a block diagram of a chipset illustrating the location of the coprocessor and schedule controller. The chipset includes a northbridge 802 and southbridge 804. The northbridge 802 handles communication among the host processor 102, coprocessor 104, read-access memory (RAM) 810, and the southbridge 804. The southbridge 804 handles communication among the second storage unit 110 and other peripheral devices. Preferably, the coprocessor 104 communicates with the northbridge 802, and the schedule controller communicates with the secondary storage unit that communicates with the southbridge 804. Communication paths interconnecting the various components in FIG. 1, such as path 806, may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In summary, persons of ordinary skill in the art will readily appreciate that methods and apparatus for interleaving two or more workloads have been provided. Among other advantages, by including a first storage unit in the coprocessor to store various contexts for workloads, retrieving context quickly to facilitate interleaving of workloads reduces overhead in the execution of the workloads compared to a prior art coprocessor that does not include a first storage unit. Further, by including a second storage, preferably external to the coprocessor, the size limitation of the first storage unit in holding context can be alleviated to allow for even additional workloads to be processed that otherwise would not be possible in the prior art. In addition, by segmenting the workloads into a plurality of workload commands to facilitate the interleaving of the two or more workloads and the at least one additional workload in the at least one command queue, the coprocessor may begin processing on portions of a workload that is available in the shared memory rather than waiting on the entire workload to be made available. Other advantages will be recognized by those of ordinary skill in the art.

The above detailed description of the embodiments and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. An apparatus for enabling a coprocessor to operate two or more workloads simultaneously, comprising:
   a host processor operatively coupled to the coprocessor, the host processor operative to offload the two or more workloads to the coprocessor;
   a schedule controller;
   the coprocessor with a dedicated first storage unit and an engine, wherein the schedule controller is operative to utilize the first storage unit to manage context stored in the first storage unit corresponding to the two or more workloads, and segment the two or more workloads into commands corresponding to the two or more workloads, the coprocessor operative to interleave the commands corresponding to the two or more workloads that are directly supported by the first storage unit, and wherein the engine receives the interleaved commands corresponding to the two or more workloads, processes the interleaved commands corresponding to the two or more workloads to provide two or more processed workloads, and reassembles the two or more processed workloads based on the context corresponding to the two or more workloads; and
   a second storage unit, wherein the schedule controller is operative to utilize the second storage unit to manage context stored in the first storage unit, the coprocessor operative to interleave at least one additional command corresponding to at least one additional workload than is directly supported by the first storage unit.

2. The apparatus of claim 1, wherein the schedule controller is further operative to assign the commands corresponding to the two or more workloads and the at least one additional command corresponding to the at least one additional workload into at least one command queue.

3. The apparatus of claim 2, wherein the schedule controller is further operative to facilitate the interleaving of the commands corresponding to the two or more workloads and the at least one additional command corresponding to the at least one additional workload in the at least one command queue.

4. The apparatus of claim 2, further comprising a command interleaver operative to interleave the commands corresponding to the two or more workloads prior to processing by the engine.

5. The apparatus of claim 4, where the command interleaver is further operative to direct the engine in saving a context associated with each of the two or more workloads and the at least one additional workload into the first storage unit.

6. The apparatus of claim 5, wherein the schedule controller utilizes the second storage unit to manage context stored in the first storage unit by saving off the context from the first storage unit to the second storage unit.

7. The apparatus of claim 6, wherein the schedule controller utilizes the second storage unit to manage context stored in the first storage unit by restoring the context from the second storage unit to the first storage unit.

8. A method of enabling a coprocessor to operate two or more workloads simultaneously, comprising:
   offloading, by a host processor operatively coupled to the coprocessor, the two or more workloads to the coprocessor;
   utilizing, by a schedule controller, a first storage unit within the coprocessor to manage context stored in the first storage unit corresponding to the two or more workloads, and segment the two or more workloads into commands corresponding to the two or more workloads, the coprocessor with an engine operative to interleave the commands corresponding to the two or more workloads that are directly supported by the first storage unit, wherein the engine is configured to receive the interleaved commands corresponding to the two or more workloads, process the interleaved commands corresponding to the two or more workloads to provide two or more processed workloads, and reassemble the two or more processed workloads based on the context corresponding to the two or more workloads; and
   utilizing, by the schedule controller, a second storage unit to manage context stored in the first storage unit, the coprocessor operative to interleave at least one additional command corresponding to at least one additional workload than is directly supported by the first storage unit.

9. The method of claim 8, wherein the schedule controller is further operative to assign the commands corresponding to the two or more workloads and the at least one additional command corresponding to the at least one additional workload into at least one command queue.

10. The method of claim 9, wherein the schedule controller is further operative to facilitate the interleaving of the commands corresponding to the two or more workloads and the at least one additional command corresponding to the at least one additional workload in the at least one command queue.

11. The method of claim 9, further comprising a command interleaver operative to interleave the commands corresponding to the two or more workloads prior to processing by the engine.

12. The method of claim 11, where the command interleaver is further operative to direct the engine in saving a context associated with each of the two or more workloads and the at least one additional workload into the first storage unit.

13. The method of claim 12, wherein the schedule controller utilizes the second storage unit to manage context stored in the first storage unit by saving off the context from the first storage unit to the second storage unit.

14. The method of claim 13, wherein the schedule controller utilizes the second storage unit to manage context stored in the first storage unit by restoring the context from the second storage unit to the first storage unit.

15. A non-transitory computer readable memory comprising:
  executable instructions for execution by a schedule controller to enable a coprocessor to simultaneously operate two or more workloads offloaded by a host processor coupled to the coprocessor, wherein the schedule controller, upon executing the executable instructions, is operable to:
    utilize a first storage unit within the coprocessor to manage context stored in the first storage unit corresponding to the two or more workloads, and segment the two or more workloads into commands corresponding to the two or more workloads, the coprocessor with an engine operative to interleave the commands corresponding to the two or more workloads that are directly supported by the first storage unit, wherein the engine receives the interleaved commands corresponding to the two or more workloads, processes the commands corresponding to the two or more workloads to provide two or more processed workloads, and reassembles the two or more processed workloads based on the context corresponding to the two or more workloads; and
    utilize a second storage unit to manage context stored in the first storage unit, the coprocessor operative to interleave at least one additional command corresponding to at least one additional workload than is directly supported by the first storage unit.

16. The non-transitory computer readable memory of claim 15, wherein the executable instructions, when executed further cause the schedule controller to:
  assign the commands corresponding to the two or more workloads and the at least one additional command corresponding to the at least one additional workload into at least one command queue.

17. The non-transitory computer readable memory of claim 16, wherein the executable instructions, when executed further cause the schedule controller to:
  facilitate the interleaving of the commands corresponding to the two or more workloads and the at least one additional command corresponding to the at least one additional workload in the at least one command queue.

18. The non-transitory computer readable memory of claim 17, wherein the executable instructions, when executed further cause the schedule controller to:
  utilize the second storage unit to manage context stored in the first storage unit by saving off the context from the first storage unit to the second storage unit.

19. The non-transitory computer readable memory of claim 18, wherein the executable instructions, when executed further cause the schedule controller to:
  utilize the second storage unit to manage context stored in the first storage unit by restoring the context from the second storage unit to the first storage unit.

* * * * *